(12) United States Patent
Fujiwara

(10) Patent No.: US 8,138,284 B2
(45) Date of Patent: *Mar. 20, 2012

(54) PROCESS FOR PRODUCING PROPYLENE BLOCK COPOLYMER

(75) Inventor: Yasuki Fujiwara, Ichikawa (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 213 days.

This patent is subject to a terminal disclaimer.

(21) Appl. No.: 12/642,153

(22) Filed: Dec. 18, 2009

(65) Prior Publication Data

US 2010/0168341 A1 Jul. 1, 2010

(30) Foreign Application Priority Data

Dec. 25, 2008 (JP) ................................. 2008-331130

(51) Int. Cl.
C08F 4/00 (2006.01)
C08F 4/06 (2006.01)
C08F 4/44 (2006.01)
C08F 210/00 (2006.01)
C08F 110/06 (2006.01)

(52) U.S. Cl. .......... 526/90; 526/126; 526/142; 526/348; 526/351

(58) Field of Classification Search .............. 526/90, 526/126, 142, 348, 351
See application file for complete search history.

(56) References Cited

U.S. PATENT DOCUMENTS

| | | | |
|---|---|---|---|
| 4,107,413 A | 8/1978 | Giannini et al. | |
| 4,157,435 A | 6/1979 | Toyota et al. | |
| 4,223,117 A | 9/1980 | Sano et al. | |
| 4,302,565 A | 11/1981 | Goeke et al. | |
| 4,396,534 A | 8/1983 | Matsuura et al. | |
| 4,490,475 A | 12/1984 | Bailly et al. | |
| 5,068,489 A | 11/1991 | Edwards et al. | |
| 5,177,162 A * | 1/1993 | Matsuura et al. | 526/70 |
| 6,521,560 B1 | 2/2003 | Kojoh et al. | |
| 2001/0021687 A1 | 9/2001 | Kumamoto et al. | |
| 2001/0044375 A1 | 11/2001 | Shinozaki et al. | |
| 2003/0195108 A1 | 10/2003 | Kumamoto et al. | |
| 2005/0267272 A1 * | 12/2005 | Kumamoto | 526/129 |
| 2010/0004395 A1 * | 1/2010 | Fujiwara | 525/88 |

FOREIGN PATENT DOCUMENTS

| | | |
|---|---|---|
| EP | 575118 B1 | 4/1997 |
| GB | 2 033 910 A | 5/1980 |
| JP | 46-34092 B | 10/1971 |
| JP | 47-041676 B | 10/1972 |
| JP | 52-036786 B | 9/1977 |
| JP | 52-039431 B | 10/1977 |
| JP | 54-148093 A | 11/1979 |
| JP | 55-023561 A | 2/1980 |
| JP | 55-052309 A | 4/1980 |
| JP | 1-28049 B | 4/1982 |
| JP | 57-24361 B | 5/1982 |
| JP | 58-021405 A | 2/1983 |
| JP | 61-181807 A | 8/1986 |
| JP | 3-43283 B | 9/1986 |
| JP | 63-142008 A | 6/1988 |
| JP | 64-6006 A | 1/1989 |
| JP | 04-227604 A | 8/1992 |
| JP | 4-80044 B | 12/1992 |
| JP | 05-339319 A | 12/1993 |
| JP | 06-179720 A | 6/1994 |
| JP | 07-102028 A | 4/1995 |
| JP | 7-116252 B | 12/1995 |
| JP | 08-134124 A | 5/1996 |
| JP | 09-031119 A | 2/1997 |
| JP | 11-080234 A | 3/1999 |
| JP | 11-228628 A | 8/1999 |
| JP | 11-322833 A | 11/1999 |
| JP | 2004-182981 A | 7/2004 |
| JP | 2006-22208 A | 1/2006 |

* cited by examiner

*Primary Examiner* — William Cheung

(74) *Attorney, Agent, or Firm* — Panitch Schwarze Belisario & Nadel LLP

(57) ABSTRACT

A production process of a propylene block copolymer, comprising the steps of (I) contacting a solid catalyst component containing titanium atoms, magnesium atoms and halogen atoms with an organoaluminum compound and an external electron donor represented by the defined formula, thereby forming a polymerization catalyst, (II) polymerizing propylene in the presence of the polymerization catalyst, thereby forming a polymer component (1) having an intrinsic viscosity, [η]1, and (III) copolymerizing propylene with an olefin other than propylene in the presence of the polymer component (1), thereby forming a polymer component (2) having an intrinsic viscosity, [η]2, which is three times or more [η]1.

6 Claims, No Drawings

PROCESS FOR PRODUCING PROPYLENE BLOCK COPOLYMER

FIELD OF THE INVENTION

The present invention relates to a process for producing a propylene block copolymer.

BACKGROUND OF THE INVENTION

Examples of a process for producing a propylene block copolymer are those disclosed in JP 2004-182981A or JP 2006-22208A. JP 2004-182981A discloses a production process thereof using a solid catalyst component produced according to a process comprising the steps of (1) reducing a titanium compound containing a Ti—O bond with an organomagnesium compound in the presence of an organosilicon compound containing a Si—O bond, thereby forming a solid catalyst component precursor having an average particle diameter of 25 μm or more, and (2) contacting the solid catalyst component precursor with a halogenating compound and an electron donor. JP 2006-22208A discloses a production process thereof using an organoaluminum compound containing an Al—CH₃ bond.

SUMMARY OF THE INVENTION

However, above production processes do not provide a propylene block copolymer excellent in its balance among impact resistance, stiffness and molding processability, with completely satisfactory productivity.

In view of the above circumstances, the present invention has an object to provide a process for producing a propylene block copolymer excellent in its impact resistance, stiffness and molding processability.

The present invention is a process for producing a propylene block copolymer, comprising the steps of:

(I) contacting a solid catalyst component containing titanium atoms, magnesium atoms and halogen atoms with an organoaluminum compound and an external electron donor represented by following formula (i), thereby forming a polymerization catalyst;

(II) homopolymerizing propylene or copolymerizing propylene with an olefin other than propylene in the presence of the polymerization catalyst, thereby forming a polymer component (1) containing 90% by weight or more of propylene units, and having an intrinsic viscosity, [η]1, of 1.0 dl/g or less, the total of polymer component (1) being 100% by weight; and (III) copolymerizing propylene with an olefin other than propylene in the presence of polymer component (1), thereby forming a polymer component (2) containing 10 to 90% by weight of propylene units, and having an intrinsic viscosity, [η]2, of 1 to 10 dl/g, which is three times or more [η]1, the total of polymer component (2) being 100% by weight,

wherein R¹ is a hydrocarbyl group having 3 to 20 carbon atoms, whose carbon atom linked directly to a silicon atom is a secondary carbon atom.

In the present invention, the term "block copolymer", which is commonly used in the technical field of the present invention, does not mean a typical block copolymer such as a styrene-butadiene block copolymer represented by the formula "SSS - - - SSSBBB - - - BBB", wherein "SSS - - - SSS" means a polymer chain consisting of styrene units and "BBB - - - BBB" means a polymer chain consisting of butadiene units, but means a copolymer produced according to a multistep polymerization method such as the production process of the present invention. The propylene block copolymer produced according to the process of the present invention is substantially a mixture of the polymer component (1) with the polymer component (2), each component containing propylene units, wherein the term "unit" means polymerization units of monomers such as propylene.

DETAILED DESCRIPTION OF THE INVENTION

In order to produce efficiently a propylene block copolymer having high stiffness, the above solid catalyst component containing titanium atoms, magnesium atoms and halogen atoms is preferably produced according to a method comprising the steps of:

(i) reducing a titanium compound represented by the following formula (ii) by an organomagnesium compound in the presence of a silicon compound containing a Si—O bond, thereby forming a solid catalyst component precursor; and (ii) contacting the solid catalyst component precursor with a halogen-containing compound and an internal electron donor, thereby forming a solid catalyst component containing titanium atoms, magnesium atoms and halogen atoms;

wherein R² is a hydrocarbyl group having 1 to 20 carbon atoms; X is a halogen atom or a hydrocarbyloxy group having 1 to 20 carbon atoms, and all Xs are the same as, or different from one another; and "a" is a number of 1 to 20.

The solid catalyst component used in the above step (I) may be known in the art. Examples of the solid catalyst component are those disclosed in patent documents such as JP 46-34092B, JP 47-41676B, JP 55-23561B (corresponding to U.S. Pat. No. 4,223,117), JP 57-24361B, JP 52-39431B (corresponding to U.S. Pat. No. 4,107,413), JP 52-36786B (corresponding to U.S. Pat. No. 4,157,435), JP 1-28049B, JP 3-43283B, JP 4-80044B, JP 55-52309A, JP 58-21405A (corresponding to U.S. Pat. No. 4,396,534), JP 61-181807A, JP 63-142008A, JP 5-339319A (corresponding to EP575118B), JP 54-148093A (corresponding to U.S. Pat. No. 4,302,565), JP 4-227604A (corresponding to U.S. Pat. No. 5,068,489), JP 64-6006A, JP 6-179720A, JP 7-116252B (corresponding to U.S. Pat. No. 4,490,475), JP 8-134124A, JP 9-31119A (corresponding to U.S. Pat. No. 6,521,560), JP 11-228628A, JP 11-80234A (corresponding to US 2001-21687), JP 11-322833A (corresponding to US 2003-195108), and JP 2004-182981A.

The solid catalyst component contains preferably an internal electron donor besides titanium atoms, magnesium atoms and halogen atoms. The internal electron donor is preferably organic acid esters or ethers mentioned hereinafter.

Examples of a production method of the solid catalyst component are the following methods (1) to (5) known in the art, and preferred is the method (5), and particularly preferred is the method (5) modified by the additional step of contacting the contact product with an organic acid halides:

(1) a method comprising the step of contacting a halogenated magnesium compound with a titanium compound;

(2) a method comprising the step of contacting a halogenated magnesium compound, a titanium compound and an internal electron donor with one another;

(3) a method comprising the steps of dissolving a halogenated magnesium compound and a titanium compound in an electron donor solvent, thereby obtaining a solution, and then impregnating a carrier material with the solution;

(4) a method comprising the step of contacting a dialkoxymagnesium compound, a halogenated titanium compound and an internal electron donor with one another; and (5) a method comprising the step of contacting a solid component containing magnesium atoms, titanium atoms and hydrocarbyloxy groups with a halogen-containing compound and an internal electron donor.

Examples of the titanium compound represented by the above formula (II) are tetramethoxytitanium, tetraethoxytitanium, tetra-n-propoxytitanium, tetraisopropoxytitanium, tetra-n-butoxytitanium, tetraisobutoxytitanium, n-butoxytitanium trichloride, di-n-butoxytitanium dichloride, tri-n-butoxytitanium chloride, tetra-n-butyltitanium dimmer, tetra-n-butyltitanium tetramer, and a combination of two or more thereof. Among them, preferred are titanium compounds having "a" of 1, 2 or 4 in the above formula (II), and particularly preferred is tetra-n-butoxytitanium.

Examples of the above silicon compound containing a Si—O bond are tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane and phenylhydropolysiloxane.

Examples of the above organomagnesium compound are methylmagnesium chloride, ethylmagnesium chloride, propylmagnesium chloride, isopropylmagnesium chloride, butylmagnesium chloride, sec-butylmagnesium chloride, tert-butylmagnesium chloride, isoamylmagnesium chloride, hexylmagnesium chloride, octylmagnesium chloride, 2-ethylhexylmagnesium chloride, phenylmagnesium chloride, and benzylmagnesium chloride.

In the present invention, the above halogen-containing compound means a compound capable of halogenating other compounds. Examples thereof are titanium tetrahalides (for example, titanium tetrachloride, titanium tetrabromide and titanium tetraiodide), alkoxytitanium trihalides (for example, methoxytitanium trichloride, ethoxytitanium trichloride, butoxytitanium trichloride, phenoxytitanium trichloride and ethoxytitanium tribromide), dialkoxytitanium dihalides (for example, dimethoxytitanium dichloride, diethoxytitanium dichloride, dibutoxytitanium dichloride, diphenoxytitanium dichloride and diethoxytitanium dibromide), tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, diisobutyldichlorotin, diphenyldichlorotin, divinyldichlorotin, methyltrichlorotin, phenyltrichlorotin, dichlorolead, methylchlorolead and phenylchlorolead.

Examples of the above internal electron donor are phthalic acid; phthalic acid derivatives such as monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, diisoheptyl phthalate, di-n-octyl phthalate, di(2-ethylhexyl) phthalate, di-n-decyl phthalate, diisodecyl phthalate, dicyclohexyl phthalate, diphenyl phthalate, and phthalic dichloride; 1,3-diethers such as 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2-isopropyl-2-isopentyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-n-heptyl-2-isopentyl-1,3-dimethoxypropane, 2-isopropyl-2-isobutyl-1,3-dimethoxypropane, 2-isopropyl-2-isopentyl-1,3-dimethoxypropane, 2,2-diisobutyl-1,3-dimethoxypropane, 2,2-diisopropyl-1,3-dimethoxypropane, and 2,2-dicyclohexyl-1,3-dimethoxypropane; and dialkyl ethers such as dimethyl ether, diethyl ether, di-n-propyl ether, diisopropyl ether, di-n-butyl ether, diisobutyl ether, di-n-amyl ether, diisoamyl ether, methyl ethyl ether, methyl n-butyl ether, and methyl cyclohexyl ether.

Examples of the above organic acid halide are monocarboxylic acid halides and polycarboxylic acid halides. More specific examples thereof are aliphatic carboxylic acid halides, alicyclic carboxylic acid halides, and aromatic carboxylic acid halides. Further specific examples thereof are acetyl chloride, propionyl chloride, butyryl chloride, valeryl chloride, acryloyl chloride, methacryloyl chloride, benzoyl chloride, toluoyl chloride, anisoyl chloride, succinoyl chloride, malonoyl chloride, maleinoyl chloride, itaconoyl chloride, and phthaloyl chloride.

The organoaluminum compound means a compound having one or more aluminum-carbon bonds in its molecule. Examples thereof are compounds represented by the following respective formulas:

$$R^3{}_w AlY_{3-w} \text{ and}$$

$$R^4R^5Al-O-AlR^6R^7,$$

wherein $R^3$ to $R^7$ are independently of one another a hydrocarbyl group having 1 to 20 carbon atoms; Y is a halogen atom, a hydrogen atom or an alkoxy group; and w is a number satisfying $2 \leq w \leq 3$.

Examples of the organoaluminum compound represented by the above formulas are trialkylaluminums such as triethylaluminum, triisobutylaluminum and trihexylaluminum; dialkylaluminum hydrides such as diethylaluminum hydride and diisobutylaluminum hydride; dialkylaluminum halides such as diethylaluminum chloride; mixtures of trialkylaluminums with dialkylaluminum halides such as a mixture of triethylaluminum with diethylaluminum chloride; and alkylalumoxanes such as tetraethyldialumoxane and tetrabutyldialumoxane. Among them, preferred are trialkylaluminums, mixtures of trialkylaluminums with dialkylaluminum halides, or alkylalumoxanes; and particularly preferred is triethylaluminum, triisobutylaluminum, a mixture of triethylaluminum with diethylaluminum chloride, or tetraethyldialumoxane, from a viewpoint of an activity of a polymerization catalyst and stereoregularity of the polymer component (1).

Examples of $R^1$ in the above formula (i) are branched-chain alkyl groups such as an isopropyl group, a sec-butyl group, a sec-hexyl group, and a sec-isoamyl group; cycloalkyl groups such as a cyclopentyl group and a cyclohexyl group; and cycloalkenyl groups such as a cyclopentenyl group.

Examples of compounds represented by the formula (I) are isopropyltriethoxysilane, sec-butyltriethoxysilane, sec-amyltriethoxysilane, cyclohexyltriethoxysilane, 2-methylcyclohexyltriethoxysilane, 2-ethylcyclohexyltriethoxysilane, 2,6-dimethylcyclohexyltriethoxysilane, 2,6-diethylcyclohexyltriethoxysilane, cyclopentyltriethoxysilane, 2-methylcyclopentyltriethoxysilane, 2-ethylcyclopentyltriethoxysilane, 2,5-dimethylcyclopentyltriethoxysilane, and 2,5-diethylcyclopentyltriethoxysilane.

In the step (I), compounds having a bond —C—O—C—O—C— may also be brought into contact. Examples of the compounds are those represented by the following formula:

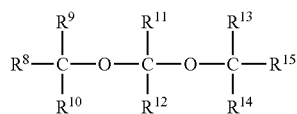

wherein $R^8$ to $R^{15}$ are independently of one another a hydrogen atom, a hydrocarbyl group having 1 to 20 carbon atoms, or a hydrocarbyloxy group having 1 to 20 carbon atoms, and any two or more of $R^8$ to $R^{15}$ may be linked with one another, to form a ring.

There are also exemplified compounds derived from the above formula, wherein any two of three carbon atoms contained in the bond —C—O—C—O—C— are linked with each other to form a ring, and each of those two carbon atoms does not carry either one of $R^8$ to $R^{15}$. Examples of those compounds are compounds, wherein the carbon atom carrying $R^8$ is linked with the carbon atom carrying $R^{15}$ to form a five-membered ring, and those two carbon atoms do not carry $R^8$ and $R^{15}$, respectively.

Examples of $R^8$ to $R^{15}$ are a methyl group, an ethyl group, a n-propyl group, an isopropyl group, a n-butyl group, an isobutyl group, a tert-butyl group, a n-pentyl group, an isopentyl group, a neopentyl group, a cyclopentyl group, a n-hexyl group, an isohexyl group, a cyclohexyl group, a n-heptyl group, a n-octyl group, a 2-ethylhexyl group, a n-decyl group, an isodecyl group, a phenyl group, a methoxy group, an ethoxy group, a n-propoxy group, an isopropoxy group, a n-butoxy group, an isobutoxy group, a tert-butoxy group, a n-pentoxy group, an isopentoxy group, a neopentoxy group, a n-hexoxy group, and an isohexoxy group.

Examples of the compounds represented by the above formula are dimethyl acetal, diethyl acetal, propylenealdehyde dimethyl acetal, n-octylaldehyde dimethyl acetal, benzaldehyde dimethyl acetal, 2,2-dimethoxypropane, 3,3-dimethoxyhexane, and 2,6-dimethyl-4,4-dimethoxyheptane.

Examples of the compounds represented by the above formula, wherein any two or more of $R^8$ to $R^{15}$ are linked with one another to form a ring, or examples of the compounds derived from the above formula, wherein any two of three carbon atoms contained in the bond —C—O—C—O—C— are linked with each other to form a ring, and each of those two carbon atoms does not carry either one of $R^8$ to $R^{15}$, are 1,1-dimethoxycyclopentane, 1,1-dimethoxycyclohexane, 1,1-diethoxycyclopentane, 1,1-diethoxycyclohexane, 2-methoxytrimethylene oxide, 2-ethoxytrimethylene oxide, 2,4-dimethoxytrimethylene oxide, 2,4-diethoxytrimethylene oxide, 2-methoxytetrahydrofuran, 2-ethoxytetrahydrofuran, 2,5-dimethoxytetrahydrofuran, 2,5-diethoxytetrahydrofuran, 2-methoxytetrahydropyrane, 2-ethoxytetrahydropyrane, 2,6-dimethoxytetrahydropyrane, 2,6-diethoxytetrahydropyrane, 1,3-dioxolan, 2-methyl-1,3-dioxolan, 4-methyl-1,3-dioxolan, 2,2-dimethyl-1,3-dioxolan, 2,4-dimethyl-1,3-dioxolan, 2-methoxy-1,3-dioxolan, 4-methoxy-1,3-dioxolan, 2,2-dimethoxy-1,3-dioxolan, 1,3-dioxane, 2-methyl-1,3-dioxane, 4-methyl-1,3-dioxane, 2,2-dimethyl-1,3-dioxane, 2,4-dimethyl-1,3-dioxane, 2-methoxy-1,3-dioxane, 4-methoxy-1,3-dioxane, 2,2-dimethoxy-1,3-dioxane, 2,4-dimethoxy-1,3-dioxane, 1,3-dioxepane, 2-methyl-1,3-dioxepane, 4-methyl-1,3-dioxepane, 5-methyl-1,3-dioxepane, 2,4-dimethyl-1,3-dioxepane, 2,5-dimethyl-1,3-dioxepane, 2-methoxy-1,3-dioxepane, 4-methoxy-1,3-dioxepane, 5-methoxy-1,3-dioxepane, and s-trioxane.

Among them, preferred are compounds represented by the above formula, wherein $R^8$ is linked with $R^{15}$ to form a ring, or are compounds derived from the formula, wherein the carbon atom carrying $R^8$ is linked with the carbon atom carrying $R^{15}$ to form a five-membered ring. Particularly preferred is 1,3-dioxolan, 1,3-dioxane, 1,3-dioxepane, or s-trioxane.

Examples of a method for contacting the solid catalyst component with the organoaluminum compound and the external electron donor in the step (I) are the following methods (1) to (4):

(1) a method comprising the steps of mixing all of them with one another, thereby forming a polymerization catalyst, and then feeding the polymerization catalyst to a polymerization reactor;

(2) a method comprising the step of feeding all of them separately to a polymerization reactor, thereby contacting them with one another in the polymerization reactor to form a polymerization catalyst;

(3) a method comprising the steps of mixing a part of them with one another, thereby forming a mixture, then mixing the mixture with remaining parts thereof, thereby forming a polymerization catalyst, and then feeding the polymerization catalyst to a polymerization reactor; and (4) a method comprising the steps of mixing a part of them with one another, thereby forming a mixture, and then feeding the mixture and remaining parts thereof to a polymerization reactor, thereby contacting them with one another in the polymerization reactor to form a polymerization catalyst.

The solid catalyst component, the organoaluminum compound, the external electron donor, and optionally-used components in the step (I) may be combined with a solvent, respectively, such as propane, butane, isobutane, pentane, hexane, heptane and octane.

The above feeding to a polymerization reactor is carried out generally in an atmosphere of an inert gas such as nitrogen and argon, and in a water-free state.

In order to produce propylene block copolymers having a good powder property, the solid catalyst component used in the step (I) is preferably a pre-polymerized solid catalyst component, as produced below. The pre-polymerized solid catalyst component can be produced by polymerizing a small amount of an olefin in the presence of the above-mentioned solid catalyst component and organoaluminum compound, wherein (i) the olefin is the same as, or different from olefins used in the step (II) or (III) in its type, and (ii) a chain-transfer agent such as hydrogen, or the above-mentioned external electron donor may be used. The above polymerization for producing the pre-polymerized solid catalyst component is generally referred to as a "pre-polymerization" in contrast to the "main polymerization" in the steps (II) and (III). The pre-polymerized solid catalyst component is, in other words, a modified solid catalyst component, whose surface is covered by the resultant olefin polymer. Such pre-polymerization is disclosed in U.S. Pat. Nos. 6,187,883 and 6,903,041.

Therefore, a process for producing a propylene block copolymer using a pre-polymerized solid catalyst component comprises the following steps (1) and (2) before the step (I):

(1) contacting a solid catalyst component containing titanium atoms, magnesium atoms and halogen atoms with an organoaluminum compound, thereby forming a contact product; and (2) polymerizing an olefin in the presence of the contact product, thereby forming a pre-polymerized solid catalyst component.

So formed pre-polymerized solid catalyst component is used in the step (I) as the solid catalyst component containing titanium atoms, magnesium atoms and halogen atoms.

The pre-polymerization is preferably a slurry polymerization in an inert hydrocarbon solvent such as propane, butane, isobutane, pentane, isopentane, hexane, heptane, octane, cyclohexane, benzene and toluene.

The organoaluminum compound in the pre-polymerization is used in an amount of generally 0.5 to 700 mol, preferably 0.8 to 500 mol, and particularly preferably 1 to 200 mol, per one mol of titanium atoms contained in the solid catalyst component used in the pre-polymerization.

An amount of the olefin pre-polymerized in the pre-polymerization is generally 0.01 to 1,000 g, preferably 0.05 to 500 g, and particularly preferably 0.1 to 200 g, per one gram of the solid catalyst component used in the pre-polymerization.

The pre-polymerization is preferably a slurry polymerization, and the slurry concentration of the solid catalyst component is preferably 1 to 500 g-solid catalyst component/liter-solvent, and particularly preferably 3 to 300 g-solid catalyst component/liter-solvent.

The pre-polymerization is carried out at preferably −20 to 100° C., and particularly preferably 0 to 80° C., and under a partial pressure of an olefin in a gas phase of preferably 0.01 to 2 MPa, and particularly preferably 0.1 to 1 MPa, provided, however, that an olefin in a liquid state under a pre-polymerization temperature and a pre-polymerization pressure is not limited thereto. A pre-polymerization time is not particularly limited, and is preferably 2 minutes to 15 hours.

Examples of a method for feeding the solid catalyst component, the organoaluminum compound and an olefin to a pre-polymerization reactor are the following methods (1) and (2)

(1) a method comprising the steps of feeding the solid catalyst component and the organoaluminum compound, and then feeding an olefin; and (2) a method comprising the steps of feeding the solid catalyst component and an olefin, and then feeding the organoaluminum compound.

Examples of a method for feeding an olefin to a pre-polymerization reactor are the following methods (1) and (2):

(1) a method of sequentially feeding an olefin to the pre-polymerization reactor, so as to keep an inner pressure of the pre-polymerization reactor at a predetermined level; and (2) a method of feeding a predetermined total amount of an olefin all together to the pre-polymerization reactor.

The pre-polymerization preferably uses an external electron donor. Preferable examples of the external electron donor are those represented by the following formula (IV) or (C2), and further preferable examples are those represented by the above formula (I) or the following formula (V):

$$R^3{}_n Si(OR^4)_{4-n} \qquad (IV)$$

wherein $R^3$ is a hydrocarbyl group having 1 to 20 carbon atoms, a hydrogen atom, or a heteroatom-containing group, and when plural $R^3$s exist, they are the same as, or different from one another; $R^4$ is a hydrocarbyl group having 1 to 20 carbon atoms, and when plural $R^4$s exist, they are the same as, or different from one another; and n is a number of 1 to 3;

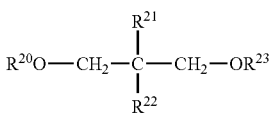

$$\text{(c2)} \quad R^{20}O-CH_2-\underset{\underset{R^{22}}{|}}{\overset{\overset{R^{21}}{|}}{C}}-CH_2-OR^{23}$$

wherein $R^{20}$ to $R^{23}$ are independently of one another a linear, branched or alicyclic alkyl, aryl or aralkyl group having 1 to 20 carbon atoms, and $R^{21}$ and $R^{22}$ may be independently of each other a hydrogen atom; and

$$R^{37}R^{38}Si(OCH_3)_2 \qquad (V)$$

wherein $R^{37}$ and $R^{38}$ area hydrocarbyl group having 1 to 20 carbon atoms, a hydrogen atom, or a heteroatom-containing group, and $R^{37}$ and $R^{38}$ are the same as, or different from each other.

Examples of the external electron donor represented by the formula (V) are diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclobutyldimethoxysilane, cyclobutylisopropyldimethoxysilane, cyclobutylisobutyldimethoxysilane, cyclobutyl-tert-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, 2-norbornanemethyldimethoxysilane, bis(perhydroquinoline)dimethoxysilane, bis(perhydroisoquinoline)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)

ethyldimethoxysilane, (perhydroquinolino)(n-propyl)dimethoxysilane, (perhydroisoquinolino) (n-propyl)dimethoxysilane, (perhydroquinolino) (tert-butyl)dimethoxysilane, and (perhydroisoquinolino)(tert-butyl)dimethoxysilane. Among them, preferred is di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclobutyldimethoxysilane, cyclobutylisopropyldimethoxysilane, cyclobutylisobutyldimethoxysilane, cyclobutyl-tert-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, or cyclohexylcyclopentyldimethoxysilane, from a viewpoint of polymerization activity of a polymerization catalyst and stereoregularity of a polymer obtained.

The external electron donor is optionally used in the pre-polymerization in an amount of generally 0.01 to 400 mol, preferably 0.02 to 200 mol, and particularly preferably 0.03 to 100 mol, per one mol of titanium atoms containing in the solid catalyst component used in the pre-polymerization, and is used in an amount of generally 0.003 to 5 mol, preferably 0.005 to 3 mol, and particularly preferably 0.01 to 2 mol, per one mol of the organoaluminum compound used in the pre-polymerization.

Examples of a method for feeding the external electron donor to a pre-polymerization reactor are the following methods (1) and (2):

(1) a method of feeding the external electron donor alone to a pre-polymerization reactor; and (2) a method of feeding a contact product of the external electron donor with the organoaluminum compound to a pre-polymerization reactor.

In order to produce propylene block copolymers having excellent stiffness, the polymer component (1) formed in the step (II) contains propylene units in an amount of 90% by weight or more, and preferably 95% by weight or more, the total of the polymer component (1) being 100% by weight. The polymer component (1) is particularly preferably a homopolymer of propylene. Examples of the olefin other than propylene used in the steps (II) and (III) are ethylene and α-olefins having 4 to 10 carbon atoms such as 1-butene, 1-pentene, 1-hexene, 1-octene, 1-nonene, 1-decene and 4-methyl-1-pentene. In order to produce propylene block copolymers having excellent stiffness, the polymer component (1) has a melting point of preferably 160° C. or higher, measured according to differential scanning calorimetry (DSC). In order to produce propylene block copolymers having excellent molding processability, and particularly injection-molding processability, the polymer component (1) has an intrinsic viscosity, $[\eta]1$, of 1.0 dl/g or less, and preferably 0.7 to 0.9 dl/g, measured at 135° C. in tetrahydronaphthalene.

In order to produce propylene block copolymers having excellent molding processability, and particularly injection-molding processability, the polymer component (2) formed in the step (III) contains propylene units in an amount of 10 to 90% by weight, and preferably 30 to 70% by weight, the total of the polymer component (2) being 100% by weight. In order to produce propylene block copolymers having excellent molding processability, and particularly injection-molding processability, the polymer component (2) is contained in the propylene block copolymer in an amount of preferably 10 to 50% by weight, and further preferably 15 to 40% by weight, the total of the propylene block copolymer being 100% by weight. In order to produce propylene block copolymers having excellent impact strength, the polymer component (2) has an intrinsic viscosity, $[\eta]2$, of 1 to 10 dl/g, preferably 2 to 9 dl/g, and more preferably 3 to 8 dl/g, measured at 135° C. in tetrahydronaphthalene. In the present invention, the intrinsic viscosity, $[\eta]2$, is three times or more, and preferably 4 times or more the intrinsic viscosity, $[\eta]1$, from a viewpoint of molding processability, stiffness, and impact resistance of the obtained propylene block copolymers.

The organoaluminum compound is used in the step (I) in an amount of usually 1 to 1,000 mol, and preferably 5 to 600 mol, per one mol of titanium atoms contained in the solid catalyst component used in the step (I).

Each of the external electron donor and the compound having a bond —C—O—C—O—C— is used in the step (I) in an amount of usually 0.1 to 2,000 mol, preferably 0.3 to 1,000 mol, and particularly preferably 0.5 to 800 mol, per one mol of titanium atoms contained in the solid catalyst component used in the step (I). Also, each of the external electron donor and the compound having a bond —C—O—C—O—C— is used in the steps (I) and (III) in an amount of usually 0.001 to 5 mol, preferably 0.005 to 3 mol, and particularly preferably 0.01 to 1 mol, per one mol of the organoaluminum compound used in the step (I).

The steps (II) and (III) are carried out at a polymerization temperature of usually −30 to 300° C., preferably 20 to 180° C., and more preferably 50 to 95° C., under an unlimited polymerization pressure, however, from an industrial and economical point of view, under usually an atmospheric pressure to 10 Ma, and preferably 0.2 to 5 MPa; and are carried out in a batch-wise or continuous polymerization type. Examples of the polymerization method in the steps (II) and (III) are (1) a slurry polymerization method using an inert hydrocarbon solvent such as propane, butane, isobutane, pentane, hexane, heptane and octane, (2) a solution polymerization method using those inert hydrocarbon solvents, (3) a bulk polymerization method using a medium of an olefin, which is liquid at a polymerization temperature, and (4) a gas-phase polymerization method. The step (III) is carried out preferably according to a gas-phase polymerization method, in order to produce the propylene block copolymer having a good powder property.

The step (II) or (III) may use a chain transfer agent such as hydrogen to regulate a molecular weight of the polymer component (1) or (2).

In the present invention, in order to have a stable polymerization reaction, or in order to obtain a molded article of propylene block copolymers excellent in its appearance and impact resistance, alkoxysilane compounds represented by the following formula may be added to the polymerization system before or during the step (III):

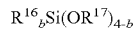

wherein $R^{16}$ is an aliphatic hydrocarbyl group having 1 to 20 carbon atoms; $R^{17}$ is a hydrocarbyl group having 1 to 20 carbon atoms; and b is a number satisfying $0 \leq b < 4$.

Examples of the alkoxysilane compounds are alkyltrialkoxysilanes such as methyltrimethoxysilane, ethyltriethoxysilane, and ethyltributoxysilane; and tetraalkoxysilanes such as tetramethoxysilane, tetraethoxysilane, tetra-n-propoxysilane, tetraisopropoxysilane, and tetra-n-butoxysilane.

Those alkoxysilane compounds may be used in combination with inert hydrocarbon solvents such as butane, hexane and heptane.

The above alkoxysilane compound is used in an amount of usually 1 to 500 mol, and preferably 10 to 200 mol, per one mol of titanium atoms contained in the solid catalyst component used in the step (I), in order to have a stable polymerization reaction, or in order to obtain a molded article of propylene block copolymers excellent in its appearance and impact resistance.

EXAMPLE

The present invention is explained in more detail with reference to the following Examples, which do not limit the present invention.

Example 1

Step (I)

A 300-liter stainless steel autoclave equipped with an agitator was dried under reduced pressure, and then was purged with argon gas. The autoclave was cooled, and then evacuated. To a glass charger containing heptane, there were charged 4.4 mmol of triethylaluminum (organoaluminum compound), 0.44 mmol of cyclopentyltriethoxysilane (external electron donor), and 9.7 mg of a solid catalyst component prepared according to JP 2004-182981A, Example 1 (2), thereby contacting them with one another in the glass charger to form a mixture containing a polymerization catalyst.

Step (II)

The mixture was charged to the autoclave all together. Then, 780 g of liquefied propylene (α-olefin) and 1 MPa of hydrogen were charged to the autoclave in this order. The autoclave was heated up to 80° C., and polymerization was carried out for 10 minutes, thereby forming a polymer component (1). Unreacted propylene monomer was purged out of the autoclave, and then, the autoclave was purged with argon gas. The polymer component (1) was sampled, which was found to have an intrinsic viscosity ([η]1) of 0.74 dl/g; 0.9% by weight of soluble parts in xylene at 20° C. (CXS); and an isotactic pentad fraction [mmmm] of 0.9794%.

Step (III)

The autoclave was decompressed. A 24-liter inner volume cylinder connected to the autoclave was evacuated. The cylinder was charged with 340 g of propylene, 140 g of ethylene, and 0.0025 MPa of hydrogen, and then was heated up to 80° C., thereby preparing a mixed gas of propylene, ethylene and hydrogen. The mixed gas in the cylinder was fed continuously to the above autoclave, thereby copolymerizing propylene with ethylene in the autoclave for 25 minutes under a polymerization pressure of 0.8 MPa. All gases were purged out of the autoclave, and the resultant polymer was dried at 60° C. for five hours under reduced pressure, thereby obtaining 159 g of powdery propylene block copolymer. A yield of the propylene block copolymer per one gram of the solid catalyst component was 16,400 g-polymer/g-solid catalyst component (polymerization activity). The propylene block copolymer was found to have an intrinsic viscosity ([η]T) of 1.31 dl/g, and was found to contain 21.8% by weight of a polymer component (2), the total of the propylene block copolymer being 100% by weight. The polymer component (2) was found to have an intrinsic viscosity ([η]2) of 3.35 dl/g, and was found to contain 47.0% by weight of ethylene units, the total of the polymer component (2) being 100% by weight. Results are summarized in Table 1.

The above intrinsic viscosities, [η]1 and [η]T, were measured according to the following method comprising the steps of:

(1) measuring respective reduced viscosities of tetrahydronaphthalene solutions having concentrations of 0.1 g/dl, 0.2 g/dl and 0.5 g/dl, at 135° C. with an Ubbellohde viscometer; and (2) calculating an intrinsic viscosity according to a method described in "Kobunshi yoeki, Kobunshi jikkengaku 11" (published by Kyoritsu Shuppan Co. Ltd. in 1982), page 491, namely, by plotting those reduced viscosities for those concentrations, and then extrapolating the concentration to zero; and the above intrinsic viscosity, [η]2, was calculated from the formula, $[\eta]2=[\eta]T/X-(1/X-1)[\eta]1$, wherein X is the content of the polymer component (2) in the propylene block copolymer, as mentioned above.

The above amount of soluble parts in xylene at 20° C., CXS, was measured according to a method comprising the steps of:

(i) adding 1 g of a polymer to 200 ml of boiling xylene, thereby obtaining a solution of the polymer in xylene;

(ii) cooling the solution slowly down to 50° C.;

(iii) further cooling the solution down to 20° C. by dipping it in an iced water bath under agitation;

(iv) keeping the solution at 20° C. for 3 hours, thereby precipitating the polymer;

(v) filtering off the precipitated polymer, thereby obtaining a filtrate;

(vi) distilling xylene contained in the filtrate away to dryness, thereby obtaining soluble parts;

(vii) weighing the soluble parts; and (viii) calculating CXS based thereon.

Generally, the smaller CXS value the polymer has, the smaller amount of amorphous polymers the polymer contains, namely, the higher stereoregularity the polymer has.

The above isotactic pentad fraction, [mmmm], was measured according to a method comprising the steps of:

(1) dissolving homogeneously about 200 mg of a polymer in 3 mL of o-dichlorobenzene in a 10 mm-Φ test tube;

(2) obtaining a $^{13}$C-NMR spectrum of the resultant solution under the following conditions,

| | |
|---|---|
| measurement temperature | 135° C., |
| pulse repetition time | 10 seconds, |
| pulse width | 45°, and |
| cumulated number | 2,500 times; | and (3) calculating an isotactic pentad fraction, [mmmm], based on the $^{13}$C-NMR spectrum, according to the method disclosed in Macromolecules No. 6, pages 925-926 (1973), and Macromolecules No. 8, pages 687-689 (1975), authored by A. Zambelli, et al. The isotactic pentad fraction is an index of stereoregularity, and its theoretical upper limit is 1.0000.

The above content (X) of the polymer component (2) contained in the propylene block copolymer, and the content of ethylene units contained in the polymer component (2) were measured according to a method comprising the steps of:

(1) dissolving homogeneously about 200 mg of a polymer in 3 mL of o-dichlorobenzene using a 10 mm-Φ test tube;

(2) obtaining a $^{13}$C-NMR spectrum of the resultant solution under the following conditions,

| | |
|---|---|
| measurement temperature | 135° C., |
| pulse repetition time | 10 seconds, |
| pulse width | 45°, and |
| cumulated number | 2,500 times; | and (3) obtaining the content (X) and the content of ethylene units, based on the $^{13}$C-NMR spectrum, according to descriptions in Macromolecules, 15, 1150-1152 (1982) by Kakugo, et al. The content of propylene units contained in the polymer component (2) was calculated from the formula, 100-X.

Example 2

Example 1 was repeated except that (1) the amount of the solid catalyst component was changed to 10.4 mg, and (2) the amount of hydrogen in the step (III) was changed to 0.005 MPa. Results are summarized in Table 1.

Example 3

Example 1 was repeated except that (1) the amount of the solid catalyst component was changed to 9.7 mg, (2) the external electron donor was changed to 0.88 mmol of sec-butyltriethoxysilane, and (3) the polymerization time in the step (III) was changed to 60 minutes. Results are summarized in Table 1.

Example 4

Example 1 was repeated except that (1) the amount of the solid catalyst component was changed to 8.2 mg, (2) the external electron donor was changed to 0.88 mmol of sec-butyltriethoxysilane, (3) the amount of hydrogen in the step (III) was changed to 0.005 MPa, and (4) the polymerization time in the step (III) was changed to 40 minutes. Results are summarized in Table 1.

Example 5

Example 1 was repeated except that (1) the solid catalyst component was changed to 9.3 mg of a solid catalyst component prepared according to JP 2723137-B2, and (2) the polymerization time in the step (III) was changed to 45 minutes. Results are summarized in Table 1.

Comparative Example 1

Example 1 was repeated except that (1) the amount of the solid catalyst component was changed to 9.5 mg, and (2) the external electron donor was changed to 0.44 mmol of cyclohexylethyldimethoxysilane. Results are summarized in Table 3.

Comparative Example 2

Example 1 was repeated except that (1) the amount of the solid catalyst component was changed to 9.8 mg, (2) the external electron donor was changed to 0.44 mmol of cyclohexylethyldimethoxysilane, and (3) the amount of hydrogen in the step (III) was changed to 0.005 MPa. Results are summarized in Table 3.

Comparative Example 3

Example 1 was repeated except that (1) the amount of the solid catalyst component was changed to 10.5 mg, (2) the external electron donor was changed to 0.44 mmol of dicyclopentyldimethoxysilane, and (3) the polymerization time in the step (III) was changed to 15 minutes. Results are summarized in Table 3.

Example 6

Step (I)

A 300-liter stainless steel autoclave equipped with an agitator was dried under reduced pressure, and then was purged with argon gas. The autoclave was cooled, and then evacuated. To a glass charger containing heptane, there were charged 2.6 mmol of triethylaluminum (organoaluminum compound), 0.26 mmol of cyclopentyltriethoxysilane (external electron donor), and 11.6 mg of a solid catalyst component prepared according to JP 2004-182981A, Example 1 (2), thereby contacting them with one another in the glass charger to form a mixture containing a polymerization catalyst.

Step (II)

The mixture was charged to the autoclave all together. Then, 780 g of liquefied propylene (α-olefin) and 0.7 MPa of hydrogen were charged to the autoclave in this order. The autoclave was heated up to 80° C., and polymerization was carried out for 10 minutes, thereby forming a polymer component (1). Unreacted propylene monomer was purged out of the autoclave, and then, the autoclave was purged with argon gas. The polymer component (1) was sampled, which was found to have an intrinsic viscosity ([η]1) of 0.78 dl/g; 1.0% by weight of soluble parts in xylene at 20° C. (CXS); and an isotactic pentad fraction [mmmm] of 0.9784%.

Step (III)

The autoclave was decompressed. There was charged a heptane solution of 0.22 mmol of tetraethoxysilane (alkoxysilane compound) to a glass charger. The heptane solution was charged to the autoclave all together, and the autoclave was agitated for 10 minutes. A 24-liter inner volume cylinder connected to the autoclave was evacuated. The cylinder was charged with 410 g of propylene, 100 g of ethylene, and 0.001 MPa of hydrogen, and then was heated up to 80° C., thereby preparing a mixed gas of propylene, ethylene and hydrogen. The mixed gas in the cylinder was fed continuously to the autoclave, thereby copolymerizing propylene with ethylene in the autoclave for 45 minutes under a polymerization pressure of 0.8 MPa. All gases were purged out of the autoclave, and the resultant polymer was dried at 60° C. for five hours under reduced pressure, thereby obtaining 187 g of powdery propylene block copolymer. A yield of the propylene block copolymer per one gram of the solid catalyst component was 16,100 g-polymer/g-solid catalyst component (polymerization activity). The propylene block copolymer was found to have an intrinsic viscosity ([η]T) of 1.38 dl/g, and was found to contain 18.9% by weight of a polymer component (2), the total of the propylene block copolymer being 100% by weight. The polymer component (2) was found to have an intrinsic viscosity ([η]2) of 3.95 dl/g, and was found to contain 36.6% by weight of ethylene units, the total of the polymer component (2) being 100% by weight. Results are summarized in Table 1.

Example 7

Example 6 was repeated except that (1) the amount of the solid catalyst component was changed to 9.0 mg, and (2) the amount of hydrogen in the step (III) was changed to 0.0025 MPa. Results are summarized in Table 1.

Example 8

Example 6 was repeated except that (1) the amount of the solid catalyst component was changed to 9.0 mg, (2) the external electron donor was changed to 0.26 mmol of cyclohexyltriethoxysilane, and (3) the polymerization time in the step (III) was changed to 50 minutes. Results are summarized in Table 1.

Example 9

Example 6 was repeated except that (1) the amount of the solid catalyst component was changed to 11.5 mg, (2) the external electron donor was changed to 0.26 mmol of cyclohexyltriethoxysilane, (3) the amount of hydrogen in the step (III) was changed to 0.0025 MPa, and (3) the polymerization time in the step (III) was changed to 50 minutes. Results are summarized in Table 2.

Example 10

Example 6 was repeated except that (1) the amount of the solid catalyst component was changed to 8.8 mg, (2) the external electron donor was changed to 0.52 mmol of sec-butyltriethoxysilane, (3) the amount of ethylene in the step (III) was changed to 95 g, and (3) the polymerization time in the step (III) was changed to 30 minutes. Results are summarized in Table 2.

Example 11

Example 6 was repeated except that (1) the amount of the solid catalyst component was changed to 7.0 mg, (2) the external electron donor was changed to 0.52 mmol of sec-butyltriethoxysilane, (3) the amount of hydrogen in the step (III) was changed to 0.0025 MPa, (4) the amount of ethylene in the step (III) was changed to 95 g, and (5) the polymerization time in the step (III) was changed to 30 minutes. Results are summarized in Table 2.

Comparative Example 4

Example 6 was repeated except that (1) the amount of the solid catalyst component was changed to 10.9 mg, (2) the external electron donor was changed to 0.26 mmol of cyclohexylethyldimethoxysilane, (3) the amount of hydrogen in the step (II) was changed to 1.0 MPa, (4) the amount of propylene in the step (III) was changed to 400 g, and (5) the polymerization time in the step (III) was changed to 25 minutes. Results are summarized in Table 3.

Comparative Example 5

Example 6 was repeated except that (1) the amount of the solid catalyst component was changed to 9.3 mg, (2) the external electron donor was changed to 0.26 mmol of cyclohexylethyldimethoxysilane, (3) the amount of hydrogen in the step (II) was changed to 1.0 MPa, (4) the amount of hydrogen in the step (III) was changed to 0.0025 MPa, (5) the amount of propylene in the step (III) was changed to 400 g, and (6) the polymerization time in the step (III) was changed to 25 minutes. Results are summarized in Table 3.

Example 12

Step (I)

A 300-liter stainless steel autoclave equipped with an agitator was dried under reduced pressure, and then was purged with argon gas. The autoclave was cooled, and then evacuated. To a glass charger containing heptane, there were charged 2.6 mmol of triethylaluminum (organoaluminum compound), 0.26 mmol of cyclopentyltriethoxysilane (external electron donor), and 12.96 mg of a solid catalyst component prepared according to JP 2004-182981A, Example 1 (2), thereby contacting them with one another in the glass charger to form a mixture containing a polymerization catalyst.

Step (II)

The mixture was charged to the autoclave all together.
Then, 780 g of liquefied propylene (α-olefin) and 0.7 MPa of hydrogen were charged to the autoclave in this order. The autoclave was heated up to 80° C., and polymerization was carried out for 10 minutes, thereby forming a polymer component (1). Unreacted propylene monomer was purged out of the autoclave, and then, the autoclave was purged with argon gas. The polymer component (1) was sampled, which was found to have an intrinsic viscosity ([η]1) of 0.78 dl/g; 1.1% by weight of soluble parts in xylene at 20° C. (CXS); and an isotactic pentad fraction [mmmm] of 0.9788%.

Step (III)

The autoclave was decompressed. There was charged a heptane solution of 0.44 mmol of tetraethoxysilane (alkoxysilane compound) to a glass charger. The heptane solution was charged to the autoclave all together, and the autoclave was agitated for 10 minutes. A 24-liter inner volume cylinder connected to the autoclave was evacuated. The cylinder was charged with 410 g of propylene, 100 g of ethylene, and 0.0025 MPa of hydrogen, and then was heated up to 80° C., thereby preparing a mixed gas of propylene, ethylene and hydrogen. The mixed gas in the cylinder was fed continuously to the autoclave, thereby copolymerizing propylene with ethylene in the autoclave for 40 minutes under a polymerization pressure of 0.8 MPa. All gases were purged out of the autoclave, and the resultant polymer was dried at 60° C. for five hours under reduced pressure, thereby obtaining 209 g of powdery propylene block copolymer. A yield of the propylene block copolymer per one gram of the solid catalyst component was 16,200 g-polymer/g-solid catalyst component (polymerization activity). The propylene block copolymer was found to have an intrinsic viscosity (NT) of 1.15 dl/g, and was found to contain 18.0% by weight of a polymer component (2), the total of the propylene block copolymer being 100% by weight. The polymer component (2) was found to have an intrinsic viscosity (N2) of 2.84 dl/g, and was found to contain 35.7% by weight of ethylene units, the total of the polymer component (2) being 100% by weight. Results are summarized in Table 2.

Example 13

Example 12 was repeated except that (1) the amount of the solid catalyst component was changed to 12.5 mg, and (2) the amount of hydrogen in the step (III) was changed to 0.005 MPa. Results are summarized in Table 2.

Comparative Example 6

Example 12 was repeated except that (1) the amount of the solid catalyst component was changed to 10.6 mg, (2) the external electron donor was changed to 0.26 mmol of cyclohexylethyldimethoxysilane, (3) the amount of hydrogen in the step (II) was changed to 1.0 MPa, (4) the amount of propylene in the step (III) was changed to 400 g, and (5) the polymerization time in the step (III) was changed to 40 minutes. Results are summarized in Table 4.

Comparative Example 7

Example 12 was repeated except that (1) the amount of the solid catalyst component was changed to 10.8 mg, (2) the external electron donor was changed to 0.26 mmol of cyclohexylethyldimethoxysilane, (3) the amount of hydrogen in the step (II) was changed to 1.0 MPa, (4) the amount of propylene in the step (III) was changed to 400 g, and (5) the amount of hydrogen in the step (III) was changed to 0.005 MPa. Results are summarized in Table 4.

Example 14

Example 12 was repeated except that (1) the amount of the solid catalyst component was changed to 10.7 mg, (2) the amount of hydrogen in the step (II) was changed to 1.0 MPa, (3) the polymerization temperature in the step (II) was changed to 70° C., (4) the polymerization time in the step (II) was changed to 20 minutes, and (5) the polymerization time in the step (III) was changed to 60 minutes. Results are summarized in Table 2.

Example 15

Example 12 was repeated except that (1) the amount of the solid catalyst component was changed to 10.9 mg, (2) the amount of hydrogen in the step (II) was changed to 1.0 MPa, (3) the polymerization temperature in the step (II) was changed to 70° C., (4) the polymerization time in the step (II) was changed to 20 minutes, and (5) the amount of hydrogen in the step (III) was changed to 0.005 MPa. Results are summarized in Table 2.

Comparative Example 8

Example 12 was repeated except that (1) the amount of the solid catalyst component was changed to 9.3 mg, (2) the external electron donor was changed to 0.26 mmol of cyclohexylethyldimethoxysilane, (3) the amount of hydrogen in the step (II) was changed to 1.0 MPa, (4) the polymerization temperature in the step (II) was changed to 70° C., (5) the polymerization time in the step (II) was changed to 20 minutes, and (6) the amount of propylene in the step (III) was changed to 400 g. Results are summarized in Table 4.

Comparative Example 9

Example 12 was repeated except that (1) the amount of the solid catalyst component was changed to 10.0 mg, (2) the external electron donor was changed to 0.26 mmol of cyclohexylethyldimethoxysilane, (3) the amount of hydrogen in the step (II) was changed to 1.0 MPa, (4) the polymerization temperature in the step (II) was changed to 70° C., (5) the polymerization time in the step (II) was changed to 20 minutes, (6) the amount of hydrogen in the step (III) was changed to 0.005 MPa, (7) the amount of propylene in the step (III) was changed to 400 g, and (8) the polymerization time in the step (III) was changed to 50 minutes. Results are summarized in Table 4.

Example 16

Step (I)

A 300-liter stainless steel autoclave equipped with an agitator was dried under reduced pressure, and then was purged with argon gas. The autoclave was cooled, and then evacuated. To a glass charger containing heptane, there were charged 2.6 mmol of triethylaluminum (organoaluminum compound), 0.26 mmol of cyclohexyltriethoxysilane (external electron donor), 0.26 mmol of 1,3-dioxolan (compound having a bond —C—O—C—O—C—), and 12.5 mg of a solid catalyst component prepared according to JP 2004-182981A, Example 1 (2), in this order, thereby contacting them with one another in the glass charger to form a mixture containing a polymerization catalyst.

Step (II)

The mixture was charged to the autoclave all together.
Then, 780 g of liquefied propylene (α-olefin) and 0.7 MPa of hydrogen were charged to the autoclave in this order. The autoclave was heated up to 80° C., and polymerization was carried out for 10 minutes, thereby forming a polymer component (1). Unreacted propylene monomer was purged out of the autoclave, and then, the autoclave was purged with argon gas. The polymer component (1) was sampled, which was found to have an intrinsic viscosity ([η]1) of 0.76 dl/g; 0.9% by weight of soluble parts in xylene at 20° C. (CXS); and an isotactic pentad fraction [mmmm] of 0.9816%.

Step (III)

The autoclave was decompressed. A 24-liter inner volume cylinder connected to the autoclave was evacuated. The cylinder was charged with 410 g of propylene, 100 g of ethylene, and 0.001 MPa of hydrogen, and then was heated up to 80° C., thereby preparing a mixed gas of propylene, ethylene and hydrogen. The mixed gas in the cylinder was fed continuously to the autoclave, thereby copolymerizing propylene with ethylene in the autoclave for 40 minutes under a polymerization pressure of 0.8 MPa. All gases were purged out of the autoclave, and the resultant polymer was dried at 60° C. for five hours under reduced pressure, thereby obtaining 159 g of powdery propylene block copolymer. A yield of the propylene block copolymer per one gram of the solid catalyst component was 12,200 g-polymer/g-solid catalyst component (polymerization activity). The propylene block copolymer was found to have an intrinsic viscosity ([η]T) of 1.38 dl/g, and was found to contain 21.7% by weight of a polymer component (2), the total of the propylene block copolymer being 100% by weight. The polymer component (2) was found to have an intrinsic viscosity ([η]2) of 3.62 dl/g, and was found to contain 35.5% by weight of ethylene units, the total of the polymer component (2) being 100% by weight. Results are summarized in Table 2.

Example 17

Example 16 was repeated except that (1) the amount of the solid catalyst component was changed to 11.3 mg, (2) the external electron donor was changed to 0.52 mmol of sec-butyltriethoxysilane, (3) the amount of ethylene in the step (III) was changed to 95 g, and (4) the polymerization time in the step (III) was changed to 50 minutes. Results are summarized in Table 5.

Comparative Example 10

Example 16 was repeated except that (1) the amount of the solid catalyst component was changed to 10.1 mg, (2) the external electron donor was changed to 0.26 mmol of cyclohexylethyldimethoxysilane, (3) the amount of hydrogen in the step (II) was changed to 1.0 MPa, (4) the amount of propylene in the step (III) was changed to 400 g, and (5) the polymerization time in the step (III) was changed to 30 minutes. Results are summarized in Table 4.

Example 18

Step (1)

To a 300-ml round-bottom glass flask equipped with an agitator, 100 ml of dewatered and degassed heptane was charged, and then, 2.7 mmol of triethylaluminum, 0.27 mol of cyclohexyltriethoxysilane (external electron donor), and 1.93 g of a solid catalyst component prepared according to JP 2004-182981A, Example 1 (2) were added thereto at 2 to 5° C. under agitating, thereby forming a mixture containing a contact product.

Step (2)

To the mixture containing the contact product, 3.8 g of propylene was added continuously at 2 to 5° C. under agitating over about three minutes, thereby forming a mixture containing a pre-polymerized solid catalyst component. To the mixture containing the pre-polymerized solid catalyst component, 150 ml of heptane was added, thereby obtaining slurry of the pre-polymerized solid catalyst component. The slurry was filtered, thereby separating the pre-polymerized solid catalyst component. The pre-polymerized solid catalyst component was washed two times with each 100 ml of hexane, and then was dried under a reduced pressure at a room temperature, thereby obtaining 6.74 g of the pre-polymerized solid catalyst component. Therefore, the pre-polymerized solid catalyst component was found to contain 0.77 g-polypropylene/g-pre-polymerized solid catalyst component. The above slurry was found to contain 0.072 g-pre-polymerized solid catalyst component/ml-slurry.

Steps (I) and (II)

A 3-liter stainless steel autoclave equipped with an agitator was dried under reduced pressure, and then was purged with argon gas. The autoclave was cooled, and then evacuated. There were charged 2.0 mmol of triethylaluminum and 0.26 mmol of cyclohexyltriethoxysilane (external electron donor) in this order to a glass charger containing heptane, thereby forming a contact product. The contact product was charged to the autoclave all together. Next, 780 g of liquefied propylene and 1.0 MPa of hydrogen were charged to the autoclave in this order. The autoclave was heated up to 70° C. Then, 0.6 mmol of triethylaluminum and 2 ml of a slurry of a pre-polymerized solid catalyst component prepared according to the method mentioned in the above Step (2) were charged in this order to a high-pressure injector containing 10 ml of heptane, thereby forming a mixture. The mixture was pressed into the autoclave all together with argon gas, thereby polymerizing propylene for ten minutes to form a polymer component (1).

Unreacted propylene monomer was purged out of the autoclave, and then, the autoclave was purged with argon gas. The polymer component (1) was sampled, which was found to have an intrinsic viscosity ([η]1) of 0.78 dl/g.

Step (III)

The autoclave was decompressed. A 30-liter autoclave connected to the above 3-liter autoclave was evacuated. The 30-liter autoclave was charged with 0.004 MPa of hydrogen, 580 g of propylene, and 140 g of ethylene, and then was heated up to 80° C., thereby preparing a mixed gas of hydrogen, propylene and ethylene. The mixed gas was fed continuously to the 3-liter autoclave, thereby copolymerizing propylene with ethylene for 30 minutes under a polymerization pressure of 0.8 MPa. All gases were purged out of the 3-liter autoclave, and the resultant polymer was dried at 60° C. for five hours under reduced pressure, thereby obtaining 118 g of powdery propylene block copolymer. The propylene block copolymer was found to have an intrinsic viscosity ([η]T) of 1.33 dl/g, and was found to contain 26.7% by weight of a polymer component (2), the total of the propylene block copolymer being 100% by weight. The polymer component (2) was found to have an intrinsic viscosity ([η]2) of 2.85 dl/g, and was found to contain 32.0% by weight of ethylene units, the total of the polymer component (2) being 100% by weight. Results are summarized in Table 5.

Example 19

Steps (1) and (2)

Example 18 was repeated except that (1) an amount of the solid catalyst component was changed to 2.04 g, and (2) the external electron donor was changed to 0.27 mol of cyclohexylethyldimethoxysilane, thereby obtaining 8.84 g of the pre-polymerized solid catalyst component. Therefore, the pre-polymerized solid catalyst component was found to contain 0.77 g-polypropylene/g-pre-polymerized solid catalyst component. The slurry of the pre-polymerized solid catalyst component was found to contain 0.035 g-pre-polymerized solid catalyst component/ml-slurry.

Steps (I) to (III)

Example 18 was repeated except that the slurry of the pre-polymerized solid catalyst component was changed to the above-obtained slurry of the pre-polymerized solid catalyst component. Results are summarized in Table 5.

Example 20

Steps (1) and (2)

Example 18 was repeated except that (1) an amount of the solid catalyst component was changed to 1.91 g, and (2) the external electron donor was changed to 0.27 mol of cyclohexylethyldimethoxysilane, thereby obtaining 7.06 g of the pre-polymerized solid catalyst component. Therefore, the pre-polymerized solid catalyst component was found to contain 0.73 g-polypropylene/g-pre-polymerized solid catalyst component. The slurry of the pre-polymerized solid catalyst component was found to contain 0.028 g-pre-polymerized solid catalyst component/ml-slurry.

Steps (I) to (III)

Example 18 was repeated except that (1) the slurry of the pre-polymerized solid catalyst component was changed to the above-obtained slurry of the pre-polymerized solid catalyst component, and (2) the external electron donor was changed to 0.26 mmol of cyclopentyltriethoxysilane. Results are summarized in Table 5.

Example 21

Steps (1) and (2)

Example 18 was repeated except that (1) an amount of the solid catalyst component was changed to 2.02 g, and (2) the external electron donor was changed to 0.27 mol of cyclohexylethyldimethoxysilane, thereby obtaining 6.57 g of the pre-polymerized solid catalyst component. Therefore, the pre-polymerized solid catalyst component was found to contain 0.70 g-polypropylene/g-pre-polymerized solid catalyst component. The slurry of the pre-polymerized solid catalyst component was found to contain 0.026 g-pre-polymerized solid catalyst component/ml-slurry.

Steps (I) to (III)

Example 18 was repeated except that (1) the slurry of the pre-polymerized solid catalyst component was changed to the above-obtained slurry of the pre-polymerized solid catalyst component, and (2) the external electron donor was changed to 0.52 mmol of sec-butyltriethoxysilane. Results are summarized in Table 5.

Comparative Example 11

Steps (1) and (2)

Example 18 was repeated except that (1) an amount of the solid catalyst component was changed to 1.96 g, and (2) the external electron donor was changed to 0.27 mol of cyclohexylethyldimethoxysilane, thereby obtaining 11.9 g of the pre-polymerized solid catalyst component. Therefore, the pre-polymerized solid catalyst component was found to contain 0.84 g-polypropylene/g-pre-polymerized solid catalyst component. The slurry of the pre-polymerized solid catalyst component was found to contain 0.048 g-pre-polymerized solid catalyst component/ml-slurry.

Steps (I) to (III)

Example 18 was repeated except that (1) the slurry of the pre-polymerized solid catalyst component was changed to the above-obtained slurry of the pre-polymerized solid catalyst component, and (2) the external electron donor was changed to 0.26 mmol of cyclohexylethyldimethoxysilane. Results are summarized in Table 5.

TABLE 1

| | Example | | | | | | | | |
|---|---|---|---|---|---|---|---|---|---|
| | 1 | 2 | 3 | 4 | 5 | 6 | 7 | 8 | 9 |
| External electron donor | | | | | | | | | |
| Kind*[1] | CPTES | CPTES | sBTES | sBTES | CPTES | CPTES | CPTES | CHTES | CHTES |
| Amount*[2] | 0.1 | 0.1 | 0.2 | 0.2 | 0.1 | 0.1 | 0.1 | 0.1 | 0.1 |
| 1,3-Dioxolan | | | | | | | | | |
| Amount*[2] | — | — | — | — | — | — | — | — | — |
| Tetraethoxysilane | | | | | | | | | |
| Amount*[2] | — | — | — | — | — | 0.08 | 0.08 | 0.08 | 0.08 |
| Step (II) | | | | | | | | | |
| Hydrogen amount (MPa) | 1.0 | 1.0 | 1.0 | 1.0 | 1.0 | 0.7 | 0.7 | 0.7 | 0.7 |
| Temperature (° C.) | 80 | 80 | 80 | 80 | 80 | 80 | 80 | 80 | 80 |
| Step (III) | | | | | | | | | |
| Propylene amount (g) | 340 | 340 | 340 | 340 | 340 | 410 | 410 | 410 | 410 |
| Ethylene amount (g) | 140 | 140 | 140 | 140 | 140 | 100 | 100 | 100 | 100 |
| Hydrogen amount (MPa) | 0.0025 | 0.005 | 0.0025 | 0.005 | 0.005 | 0.001 | 0.0025 | 0.001 | 0.0025 |
| Yield of block copolymer*[3] | 16,400 | 17,600 | 14,600 | 14,100 | 18,800 | 16,100 | 16,400 | 16,400 | 15,900 |
| Polymer component (1) | | | | | | | | | |
| $[\eta]1$ (dl/g) | 0.74 | 0.77 | 0.65 | 0.68 | 0.63 | 0.78 | 0.76 | 0.77 | 0.77 |
| CXS (wt %) | 0.9 | 0.9 | 1.0 | 1.2 | 2.1 | 1.0 | 1.1 | 1.3 | 1.2 |
| [mmmm] (%) | 0.9794 | 0.9794 | 0.9793 | 0.9757 | 0.9687 | 0.9784 | 0.9760 | 0.9773 | 0.9766 |
| Polymer component (2) | | | | | | | | | |
| $[\eta]2$ (dl/g) | 3.35 | 2.81 | 2.99 | 2.71 | 3.36 | 3.95 | 3.15 | 3.64 | 2.85 |
| Content (wt %)*[4] | 21.8 | 22.5 | 27.3 | 25.1 | 18.7 | 18.9 | 19.7 | 19.5 | 19.7 |
| $C_2'$ unit content (wt %)*[5] | 47.0 | 44.7 | 48.5 | 50.0 | 48.0 | 36.6 | 35.7 | 38.5 | 35.8 |

TABLE 1-continued

|  | Example | | | | | | | | |
|---|---|---|---|---|---|---|---|---|---|
|  | 1 | 2 | 3 | 4 | 5 | 6 | 7 | 8 | 9 |
| $C_3'$ unit content (wt %)*6 | 53.0 | 55.3 | 51.5 | 50.0 | 52.0 | 63.4 | 64.3 | 61.5 | 64.2 |
| $[\eta]2/[\eta]1$ | 4.53 | 3.66 | 4.61 | 3.99 | 5.33 | 5.07 | 4.14 | 4.73 | 3.70 |

TABLE 2

|  | Example | | | | | | | |
|---|---|---|---|---|---|---|---|---|
|  | 10 | 11 | 12 | 13 | 14 | 15 | 16 | 17 |
| External electron donor | | | | | | | | |
| Kind*1 | sBTES | sBTES | CPTES | CPTES | CPTES | CPTES | CHTES | sBTES |
| Amount*2 | 0.2 | 0.2 | 0.1 | 0.1 | 0.1 | 0.1 | 0.1 | 0.2 |
| 1,3-Dioxolan | | | | | | | | |
| Amount*2 | — | — | — | — | — | — | 0.1 | 0.1 |
| Tetraethoxysilane | | | | | | | | |
| Amount*2 | 0.08 | 0.08 | 0.17 | 0.17 | 0.17 | 0.17 | — | — |
| Step (II) | | | | | | | | |
| Hydrogen amount (MPa) | 0.7 | 0.7 | 0.7 | 0.7 | 1.0 | 1.0 | 0.7 | 0.7 |
| Temperature (° C.) | 80 | 80 | 80 | 80 | 70 | 70 | 80 | 80 |
| Step (III) | | | | | | | | |
| Propylene amount (g) | 410 | 410 | 410 | 410 | 410 | 410 | 410 | 410 |
| Ethylene amount (g) | 95 | 95 | 100 | 100 | 100 | 100 | 100 | 95 |
| Hydrogen amount (MPa) | 0.001 | 0.0025 | 0.0025 | 0.005 | 0.0025 | 0.005 | 0.001 | 0.001 |
| Yield of block copolymer*3 | 13,800 | 14,300 | 16,200 | 16,000 | 18,800 | 19,200 | 12,200 | 12,200 |
| Polymer component (1) | | | | | | | | |
| $[\eta]1$ (dl/g) | 0.78 | 0.78 | 0.78 | 0.84 | 0.77 | 0.75 | 0.76 | 0.77 |
| CXS (wt %) | 1.1 | 1.2 | 1.1 | 1.0 | 1.2 | 1.3 | 0.9 | 0.9 |
| [mmmm] (%) | 0.9781 | 0.9769 | 0.9788 | 0.9774 | 0.9789 | 0.9774 | 0.9816 | 0.9792 |
| Polymer component (2) | | | | | | | | |
| $[\eta]2$ (dl/g) | 3.51 | 3.18 | 2.84 | 2.53 | 4.10 | 2.84 | 3.62 | 3.46 |
| Content (wt %)*4 | 17.2 | 17.9 | 18.0 | 20.7 | 15.9 | 17.7 | 21.7 | 19.3 |
| $C_2'$ unit content (wt %)*5 | 39.1 | 39.1 | 35.7 | 34.5 | 39.6 | 35.0 | 35.5 | 38.1 |
| $C_3'$ unit content (wt %)*6 | 60.9 | 60.9 | 64.3 | 65.5 | 60.4 | 65.0 | 64.5 | 61.9 |
| $[\eta]2/[\eta]1$ | 4.50 | 4.08 | 3.64 | 3.01 | 5.33 | 3.79 | 4.76 | 4.50 |

TABLE 3

|  | Comparative Example | | | | |
|---|---|---|---|---|---|
|  | 1 | 2 | 3 | 4 | 5 |
| External electron donor | | | | | |
| Kind*1 | CHEDMS | CHEDMS | DCPDMS | CHEDMS | CHEDMS |
| Amount*2 | 0.1 | 0.1 | 0.1 | 0.1 | 0.1 |
| 1,3-Dioxolan | | | | | |
| Amount*2 | — | — | — | — | — |
| Tetraethoxysilane | | | | | |
| Amount*2 | — | — | — | 0.08 | 0.08 |
| Step (II) | | | | | |
| Hydrogen amount (MPa) | 1.0 | 1.0 | 1.0 | 1.0 | 1.0 |
| Temperature (° C.) | 80 | 80 | 80 | 80 | 80 |
| Step (III) | | | | | |
| Propylene amount (g) | 340 | 340 | 340 | 400 | 400 |
| Ethylene amount (g) | 140 | 140 | 140 | 100 | 100 |
| Hydrogen amount (MPa) | 0.0025 | 0.005 | 0.0025 | 0.001 | 0.0025 |
| Yield of block copolymer*3 | 18,200 | 20,500 | 24,800 | 18,400 | 18,600 |

TABLE 3-continued

|  | Comparative Example | | | | |
|---|---|---|---|---|---|
|  | 1 | 2 | 3 | 4 | 5 |
| Polymer component (1) | | | | | |
| [η]1 (dl/g) | 0.88 | 0.91 | 1.21 | 0.91 | 0.89 |
| CXS (wt %) | 0.8 | 0.9 | 0.5 | 0.8 | 1.4 |
| [mmmm] (%) | 0.9806 | 0.9795 | 0.9876 | 0.9811 | 0.9810 |
| Polymer component (2) | | | | | |
| [η]2 (dl/g) | 2.27 | 1.93 | 2.52 | 2.56 | 2.49 |
| Content (wt %)*4 | 20.1 | 20.6 | 19.8 | 18.2 | 17.5 |
| $C_2'$ unit content (wt %)*5 | 43.9 | 41.1 | 34.9 | 35.4 | 36.3 |
| $C_3'$ unit content (wt %)*6 | 56.1 | 58.9 | 65.1 | 64.6 | 63.7 |
| [η]2/[η]1 | 2.58 | 2.12 | 2.09 | 2.81 | 2.80 |

TABLE 4

|  | Comparative Example | | | | |
|---|---|---|---|---|---|
|  | 6 | 7 | 8 | 9 | 10 |
| External electron donor | | | | | |
| Kind*1 | CHEDMS | CHEDMS | CHEDMS | CHEDMS | CHEDMS |
| Amount*2 | 0.1 | 0.1 | 0.1 | 0.1 | 0.1 |
| 1,3-Dioxolan | | | | | |
| Amount*2 | — | — | — | — | 0.1 |
| Tetraethoxysilane | | | | | |
| Amount*2 | 0.17 | 0.17 | 0.17 | 0.17 | — |
| Step (II) | | | | | |
| Hydrogen amount (MPa) | 1.0 | 1.0 | 1.0 | 1.0 | 1.0 |
| Temperature (° C.) | 80 | 80 | 70 | 70 | 80 |
| Step (III) | | | | | |
| Propylene amount (g) | 400 | 400 | 400 | 400 | 400 |
| Ethylene amount (g) | 100 | 100 | 100 | 100 | 100 |
| Hydrogen amount (MPa) | 0.0025 | 0.005 | 0.0025 | 0.005 | 0.001 |
| Yield of block copolymer*3 | 16,600 | 17,900 | 16,700 | 18,300 | 14,300 |
| Polymer component (1) | | | | | |
| [η]1 (dl/g) | 0.90 | 0.88 | 0.90 | 0.87 | 0.90 |
| CXS (wt %) | 0.9 | 1.0 | 1.3 | 1.2 | 0.9 |
| [mmmm] (%) | 0.9775 | 0.9795 | 0.9735 | 0.9810 | 0.9813 |
| Polymer component (2) | | | | | |
| [η]2 (dl/g) | 2.59 | 2.34 | 3.35 | 2.72 | 2.71 |
| Content (wt %)*4 | 19.5 | 20.6 | 20.0 | 17.8 | 16.0 |
| $C_2'$ unit content (wt %)*5 | 35.8 | 34.2 | 38.3 | 38.2 | 37.3 |
| $C_3'$ unit content (wt %)*6 | 64.2 | 65.8 | 61.7 | 61.8 | 62.7 |
| [η]2/[η]1 | 2.88 | 2.65 | 3.72 | 3.13 | 3.01 |

TABLE 5

|  | Example | | | | Comparative |
|---|---|---|---|---|---|
|  | 18 | 19 | 20 | 21 | Example 11 |
| External electron donor in step (1) | | | | | |
| Kind*1 | CHTES | CHEDMS | CHEDMS | CHEDMS | CHEDMS |
| Amount*2 | 0.1 | 0.1 | 0.1 | 0.1 | 0.1 |
| External electron donor in step (I) | | | | | |
| Kind*1 | CHTES | CHTES | CPTES | sBTES | CHEDMS |
| Amount*2 | 0.1 | 0.1 | 0.1 | 0.2 | 0.1 |
| Step (II) | | | | | |
| Hydrogen amount (MPa) | 1.0 | 1.0 | 1.0 | 1.0 | 1.0 |
| Temperature (° C.) | 70 | 70 | 70 | 70 | 70 |

TABLE 5-continued

|  | Example | | | | Comparative |
|---|---|---|---|---|---|
|  | 18 | 19 | 20 | 21 | Example 11 |
| Step (III) | | | | | |
| Propylene amount (g) | 580 | 580 | 580 | 580 | 580 |
| Ethylene amount (g) | 140 | 140 | 140 | 130 | 150 |
| Hydrogen amount (MPa) | 0.0040 | 0.0040 | 0.0040 | 0.0040 | 0.0040 |
| Yield of block copolymer*[3] | 15,400 | 17,700 | 18,400 | 14,500 | 17,300 |
| Polymer component (1) | | | | | |
| [η]1 (dl/g) | 0.78 | 0.87 | 0.87 | 0.87 | 1.04 |
| CXS (wt %) | 1.3 | 1.2 | 1.1 | 1.2 | 0.9 |
| Polymer component (2) | | | | | |
| [η]2 (dl/g) | 2.85 | 2.67 | 2.84 | 3.86 | 2.13 |
| Content (wt %)*[4] | 26.6 | 24.5 | 24.9 | 16.7 | 31.2 |
| $C_2'$ unit content (wt %)*[5] | 32.0 | 33.1 | 33.2 | 36.6 | 31.8 |
| $C_3'$ unit content (wt %)*[6] | 68.0 | 66.9 | 66.8 | 63.4 | 68.2 |
| [η]2/[η]1 | 3.65 | 3.06 | 3.26 | 4.44 | 2.05 |

*[1]CPTES: cyclopentyltriethoxysilane sBTES: sec-butyltriethoxysilane CHTES: cyclohexyltriethoxysilane CHEDMS: cyclohexylethyldimethoxysilane DCPDMS: dicyclopentyldimethoxysilane
*[2]mol/mol-organoaluminum compound
*[3]g-propylene block copolymer/g-solid catalyst component
*[4]Amount of polymer component (2) contained in propylene block copolymer, the total of the propylene block copolymer being 100% by weight.
*[5]Amount of ethylene units contained in polymer component (2), the total of the polymer component (2) being 100% by weight.
*[6]Amount of propylene units contained in polymer component (2), the total of the polymer component (2) being 100% by weight.

As explained above, propylene block copolymers obtained according to the production process of the present invention (Examples) are excellent in the following points (i) and (ii), in comparison with propylene block copolymers obtained in Comparative Examples:
(i) use of even a small amount of hydrogen can produce the polymer component (1) having a low intrinsic viscosity; and
(ii) use of a similar amount of hydrogen can produce the polymer component (2) having a high intrinsic viscosity.

Therefore, according to the production process of a block copolymer of the present invention, there can be obtained a propylene block copolymer excellent in its impact resistance, stiffness and molding processability.

The invention claimed is:

1. A process for producing a propylene block copolymer, comprising the steps of:
   (I) contacting a solid catalyst component containing titanium atoms, magnesium atoms and halogen atoms with an organoaluminum compound and an external electron donor represented by following formula (i), thereby forming a polymerization catalyst;
   (II) homopolymerizing propylene or copolymerizing propylene with an olefin other than propylene in the presence of the polymerization catalyst, thereby forming a polymer component (1) containing 90% by weight or more of propylene units, and having an intrinsic viscosity, [η]1, of 1.0 dl/g or less, the total of polymer component (1) being 100% by weight; and
   (III) copolymerizing propylene with an olefin other than propylene in the presence of polymer component (1), thereby forming a polymer component (2) containing 10 to 90% by weight of propylene units, and having an intrinsic viscosity, [η]2, of 1 to 10 dl/g, which is three times or more the total of polymer component (2) being 100% by weight,

   $R^1Si(OC_2H_5)_3$     (i)

wherein $R^1$ is a hydrocarbyl group having 3 to 20 carbon atoms, whose carbon atom linked directly to the silicon atom is a secondary carbon atom.

2. The process according to claim 1, wherein a compound having a bond —C—O—C—O—C— is further brought into contact in step (I).

3. The process according to claim 1, wherein the process contains following steps (i) and (ii) before step (I):
   (i) reducing a titanium compound represented by following formula (ii) by an organomagnesium compound in the presence of a silicon compound containing a Si—O bond, thereby forming a solid catalyst component precursor; and
   (ii) contacting the solid catalyst component precursor with a halogen-containing compound and an internal electron donor, thereby forming a solid catalyst component containing titanium atoms, magnesium atoms and halogen atoms, which corresponds to the solid catalyst component in step (I);

(ii)

wherein $R^2$ is a hydrocarbyl group having 1 to 20 carbon atoms; X is independently of one another a halogen atom or a hydrocarbyloxy group having 1 to 20 carbon atoms; and "a" is a number of 1 to 20.

4. The process according to claim 1, wherein the process contains following steps (1) and (2) before step (I):
   (1) contacting a solid catalyst component containing titanium atoms, magnesium atoms and halogen atoms with an organoaluminum compound and an external electron donor represented by following formula (IV), thereby forming a contact product; and (2) polymerizing an α-olefin in the presence of the contact product, thereby forming a pre-polymerized solid catalyst component containing titanium atoms, magnesium atoms and halogen atoms, which corresponds to the solid catalyst component in step (I):

$$R^3{}_n Si(OR^4)_{4-n} \qquad (IV)$$

wherein $R^3$ is independently of one another a hydrocarbyl group having 1 to 20 carbon atoms, a hydrogen atom, or a heteroatom-containing group; $R^4$ is independently of one another a hydrocarbyl group having 1 to 20 carbon atoms; and n is a number of 1 to 3.

5. The process according to claim 4, wherein the external electron donor represented by formula (IV) is a compound represented by following formula (V):

$$R^{37}R^{38}Si(OCH_3)_2 \qquad (V)$$

wherein $R^{37}$ and $R^{38}$ are independently of each other a hydrocarbyl group having 1 to 20 carbon atoms, a hydrogen atom, or a heteroatom-containing group.

6. The process according to claim 4, wherein the external electron donor represented by formula (IV) is an external electron donor represented by formula (i).

* * * * *